US011975456B2

(12) United States Patent
Petrelli

(10) Patent No.: US 11,975,456 B2
(45) Date of Patent: May 7, 2024

(54) SHAVING APPARATUS WITH IMPROVED CAP FUNCTIONALITY

(71) Applicant: KONINKLIJKE PHILIPS N.V., Eindhoven (NL)

(72) Inventor: Marcus Cornelis Petrelli, Groningen (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 17/283,030

(22) PCT Filed: Oct. 28, 2019

(86) PCT No.: PCT/EP2019/079316
§ 371 (c)(1),
(2) Date: Apr. 6, 2021

(87) PCT Pub. No.: WO2020/094432
PCT Pub. Date: May 14, 2020

(65) Prior Publication Data

US 2021/0347073 A1 Nov. 11, 2021

(30) Foreign Application Priority Data

Nov. 5, 2018 (EP) .................................... 18204327

(51) Int. Cl.
*B26B 19/14* (2006.01)

(52) U.S. Cl.
CPC .......... *B26B 19/143* (2013.01); *B26B 19/145* (2013.01)

(58) Field of Classification Search
CPC ............................ B26B 19/143; B26B 19/141
(Continued)

(56) References Cited

U.S. PATENT DOCUMENTS 3,233,323 A * 2/1966 Driessen ................ B26B 19/14 30/34.2
3,639,979 A 2/1972 Zuurveen
(Continued)

FOREIGN PATENT DOCUMENTS

CN 101879722 11/2010
EP 0329244 A1 * 8/1989
(Continued)

OTHER PUBLICATIONS

International Search Report and Written Opinion Dated Jan. 13, 2020 For International Application No. PCT/EP2019/079316 Filed Oct. 28, 2019.

*Primary Examiner* — Jennifer S Matthews

(57) ABSTRACT

A shaver includes a housing and at least one cutter accommodated by the housing. Each cutter includes an external cutting member and an internal cutting member which is rotatable relative to the external cutting member about an axis of rotation. A locking system is configured and arranged to prevent rotation of the external cutting member relative to the housing. The locking system includes an annular array of N1 first arresting elements and N2 second arresting elements, wherein $N1 \geq 8$ and $1 \leq N2 \leq N1$. The N2 second arresting elements are configured and arranged to be each engageable with a respective one of the N1 first arresting elements in any of N1 angular positions of the external cutting member about the axis of rotation relative to the housing.

16 Claims, 9 Drawing Sheets

(58) Field of Classification Search
USPC ........ 30/43.4, 43.5, 43.6, 43.9, 43.91, 43.92
See application file for complete search history.

(56) References Cited

U.S. PATENT DOCUMENTS

| | | | | |
|---|---|---|---|---|
| 3,768,160 | A | 10/1973 | Bergsma | |
| 4,168,570 | A | 9/1979 | Bakker | |
| 4,318,223 | A | 3/1982 | Bergsma | |
| 4,711,028 | A * | 12/1987 | Bergsma | B26B 19/386 30/346.51 |
| 2002/0029479 | A1 * | 3/2002 | Nakano | B26B 19/14 30/346.51 |
| 2004/0205969 | A1 * | 10/2004 | Haites | B26B 19/141 30/43.6 |
| 2015/0224654 | A1 * | 8/2015 | Steur | B26B 19/14 30/43.6 |
| 2020/0361103 | A1 * | 11/2020 | Paauw | B26B 19/143 |

FOREIGN PATENT DOCUMENTS

| | | |
|---|---|---|
| EP | 0484795 | 5/1992 |
| EP | 01713752 | 5/1996 |
| GB | 1406139 | 9/1975 |
| GB | 1406140 | 9/1975 |
| NL | 7607258 | 1/1978 |
| RU | 2101166 | 1/1998 |

* cited by examiner

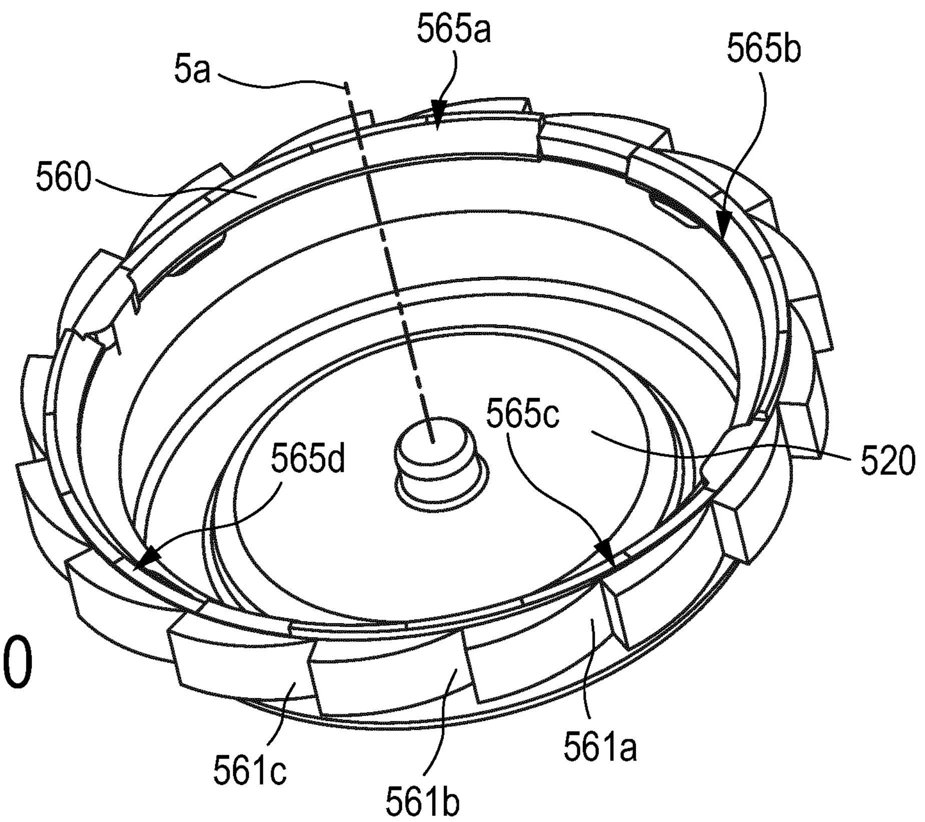
Fig. 10
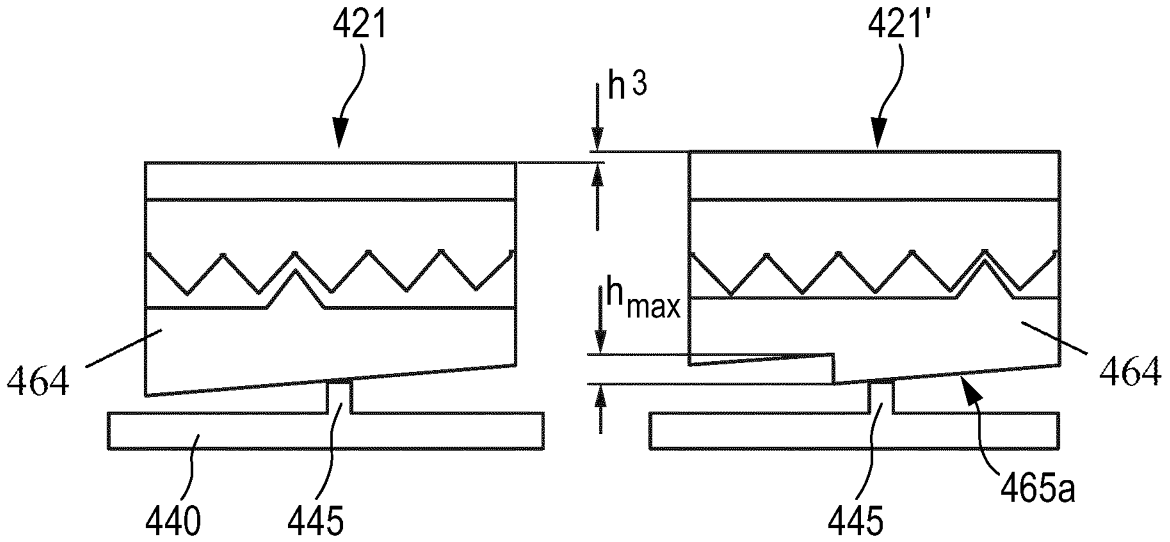
Fig. 11A
Fig. 11B

SHAVING APPARATUS WITH IMPROVED CAP FUNCTIONALITY

CROSS REFERENCE TO RELATED APPLICATIONS

This application is the U.S. National Phase application under 35 U.S.C. § 371 of International Application No. PCT/EP2019/079316 filed Oct. 28, 2019, which claims the benefit of European Patent Application Number 18204327.3 filed Nov. 5, 2018. These applications are hereby incorporated by reference herein.

FIELD OF THE INVENTION

The invention relates to a shaving unit comprising a housing and at least one cutting unit accommodated and supported by the housing, wherein each cutting unit comprises: an external cutting member having a plurality of hair-entry openings; and an internal cutting member which is rotatable relative to the external cutting member about an axis of rotation; wherein the shaving unit comprises, for each cutting unit, a locking system configured and arranged to prevent, during use, rotation of the external cutting member of the respective cutting unit relative to the housing at least in a rotational direction of the internal cutting member about the axis of rotation, said locking system comprising a first locking member connected to one of the housing and the external cutting member and a second locking member connected to the other one of the housing and the external cutting member for cooperation with the first locking member locking system locking system.

BACKGROUND OF THE INVENTION

A shaving unit of this type is employed in electrical shavers including one, two, three or more cutting units. Generally, in such a shaving unit, the cutting function of the hair to be cut is provided by a shear force applied to the hair by the hair entering through one of the hair entry openings in the external cutting member and then being sheared by the cutting element of the internal cutting member, which is rotated with respect to said hair entry opening. Whilst the internal cutting member is driven into a rotational movement about the axis of rotation, the external cutting member and the housing are kept stationary with respect to said axis of rotation such that a relative movement between the internal cutting member and the external cutting member is provided.

The external cutting member, which could be entitled as a cap or could comprise a cap being in contact with the skin of the user in operation, is therefore to be held in a stationary condition during operation with respect to said rotation. Since in operation, a pressure applied to the external cutting member may produce a contact between the external cutting member and the rotating internal cutting member, or even cause a cutting member of the internal cutting member to form-lock with a hair entry opening of the external cutting member, thus causing a significant torque about the axis of rotation onto the external cutting member, it is known to provide a safe, torque-resistant mounting of said external cutting member in the shaving unit.

To prevent such rotation of the external cutting member it is known to provide a locking system with a first and a second locking member associated to the external cutting member and the housing such that the housing and the external cutting member are mounted in a predefined position by a locking engagement to each other.

Multiple solutions are known, where such mounting is provided by a form-locking engagement to effect said torque-resistant mounting in the shaving unit. For example, GB 1 406 139 discloses a shaver, wherein cooperating interlocking means are provided comprising one or more mutually engaging projections and recesses forming a coupling to prevent rotating of a shear plate assembly relative to an inner stop member. U.S. Pat. No. 4,168,570 discloses a shaver, wherein a pin engaging with a groove is provided to lock the cap against rotation. U.S. Pat. No. 4,318,223 discloses a shaver wherein a resilient member engages a groove formed at the cap to prevent rotation of the cap.

A relevant problem associated with such anti-rotating means is related to the design of shavers allowing a tilting movement of such cutting unit to better follow the contour of the skin of the user. In order to maintain the anti-rotating function even under such tilted position, U.S. Pat. No. 3,233,323A discloses a total of three form locking systems formed by abutments located in grooves. Such design may allow the cap to perform an up-and-down movement with restricted depth and to stay secured against rotation in any of such shifted or tilted positions. The shear plates 3 in U.S. Pat. No. 3,233,323 can each be depressed against spring action until a lower supporting edge 4 of the shear plate 3 abuts against the upright teeth 6 of a stop ring 5 located below the shear plate 3. The height position of the stop ring 5 can be adjusted by the user by rotating a lever 11. Different height positions of the stop ring 5 correspond with different distances through which the shear plate 5 can be depressed against the spring action.

Whilst all these prior art solutions have shown to safely prevent the cap from rotation if the engaging locking systems are locked into each other, a problem arises from the need to open or remove the cutting unit in order to either clean the shaving unit from debris and cut hair or to replace a damaged part of the cutting unit. In the course of such maintenance, the form-locking mechanism shown in the prior art needs to be decoupled and, upon assembling the cutting unit thereafter, needs to be recoupled again. In the course of such assembling, the inventors found that the coupling of the form-locking mechanism is difficult to accomplish by the user and likely to produce misalignment. In particular, if multiple form locking system have to be coupled to each other, this may form a burden to the user and is likely to produce a misalignment. Such misalignment may either produce damage to the cap if it is pressed into the shaving unit in such misaligned orientation or, even worse, such misalignment may even allow the shaving unit to be assembled but during use a cutting member of the internal cutting element may then protrude through a hair entry opening and hereby cause the external cutting member to rotate, or at least to rotate until the form-locking members engage each other. By this, the protruding cutting member may cause a cut into the skin of the user.

It is an object of the invention to significantly simplify the assembly of the shaving unit by the user and, thereby, to significantly reduce the above mentioned risks of misalignment and damage of the shaving unit and of harm to the user's skin.

SUMMARY OF THE INVENTION

According to the invention, this object is achieved by a shaving unit according to claim 1. The shaving unit is characterized in that the first locking member comprises an annular array of N1 first arresting elements which are concentrically arranged relative to the axis of rotation with a uniform distribution about the axis of rotation, and in that the second locking member comprises N2 second arresting elements, wherein:

$N1 \geq 8$ and $1 \leq N2 \leq N1$;

the N2 second arresting elements are configured and arranged to be each engageable with a respective one of the N1 first arresting elements in any of N1 angular positions of the external cutting member about the axis of rotation relative to the housing; and each of the N2 second arresting elements is configured and arranged to prevent rotation of the external cutting member relative to the housing in said rotational direction by engagement with said respective one of the N1 first arresting elements in any of said N1 angular positions of the external cutting member.

According to the invention, at least eight different angular positions are provided by the locking system wherein rotational movement of the external cutting member is prevented. It is preferred that more than 8, e.g. more than 9, 10, 12, 16, 18, 36 or even more than these numbers of possible angular positions are provided by the locking system. By this, the external cutting member can be locked in a significant large number of alternative angular positions and thus, assembling of the external cutting member is significantly facilitated and the risk of misalignment and non-form-locking of the external cutting member is significantly reduced.

The locking system of the invention comprises a first locking member which may be attached to or integral with one of the external cutting member and the housing, such that the first locking member is connected to said one of the external cutting member and the housing in a stationary position relative to said one of the external cutting member and the housing, at least in the rotational direction of the internal cutting member. The first locking member comprises a number of N1 first arresting elements wherein N1 is equal to or higher than eight. A first arresting element shall be understood to be formed by a geometrical structure defining a predefined position when being engaged by a matching second arresting element. An arresting element might e.g. be formed by an indentation or a recess like e.g. a groove, a notch, an opening, and an arresting element might e.g. be formed by a protrusion like e.g. a tooth or a pin.

Further, a second locking member is comprised in the locking system, which second locking member may be attached to or integral with the corresponding other one of the external cutting member and the housing, such that the second locking member is connected to said other one of the external cutting member and the housing in a stationary position relative to said other one of the external cutting member and the housing, at least in the rotational direction of the internal cutting member. The second locking member comprises at least one second arresting element and a maximum number of second arresting elements which is equal to the number of first arresting elements. The second arresting element(s) is/are adapted to engage with a single or a plurality of the first arresting elements to provide a locking function of the first and the second locking members to each other about the axis of rotation. This locking function may e.g. be a form-locking function. As an example, a protrusion like a tooth or pin engaging an indentation like a groove or opening may establish such a form locking engagement.

According to the invention, a number of at least eight different angular positions of the external cutting member relative to the housing is provided, which is far beyond the number of angular positions provided by a locking system which is only adapted to effect the locking function under e.g. any tilted position of the cap. In contrast, the different angular positions are provided to ensure that the user will easily find a locked position of the external cutting member upon assembling of the shaving unit after cleaning, maintenance or repair. By this, the user may rotate the external cutting member about an angle of less than 45° to find a locked position and by this, it is unlikely that the user does not find such correct locked position and assembles the shaving unit in a wrong way without engagement of the locking system.

The first arresting elements are concentrically arranged relative to the axis of rotation and are arranged with a uniform distribution. Thus, the first arresting elements may be positioned on a circle line or circle segment about the axis of rotation and the distance between each two adjacent first arresting elements is constant. This arrangement provides for an easy and reliable positioning of the first and the second locking member relative to each other with a locking function against rotation about the axis of rotation by an engagement of the first and the second arresting elements.

Generally, according to the invention, the housing may comprise an annular housing portion surrounding the external cutting member and a base portion arranged underneath the external cutting member. These or other parts of the housing of the shaving unit may provide the locking system function between said housing and said external cutting member.

These and other aspects of the invention will be apparent from and elucidated with reference to the embodiments described hereinafter. It shall be understood that a preferred embodiment of the present invention can also be any combination of the dependent claims or above embodiments with the respective independent claim.

According to a first preferred embodiment, $N1 \geq 16$, preferably $N1 \geq 32$. According to this embodiment, at least sixteen or even at least thirty-two first arresting elements are provided at the first locking member. Thereby, the maximum required rotation of the external cutting member relative to the housing for the user to find a locked position of the external cutting member during assembly of the shaving unit is limited to less than 22.5° or less than 11.25°.

Further, said locking system may be form-locking means. Whilst generally a frictional engagement or form-locking engagement may be provided to effect the locking of the external cutting member against rotation, it is preferred to employ a form-locking function by said locking system. Generally, such locking system may comprise abutting surfaces at the external cutting member and the housing, the abutting surfaces having an orientation such as to transfer forces acting about said axis of rotation. By such orientation, these abutting surfaces will serve as anti-rotating means to prevent rotation of the external cutting member about said axis of rotation in relation to the housing. It is understood that said locking system may comprise a plurality of such abutting surfaces either at the housing or at the external cutting member or both.

It is further preferred that the external cutting member is made from a metal and the respective one of the first and second locking members connected to the external cutting member is integrally formed with a plastic carrier which is connected to the external cutting member. As an integral forming, it shall be understood that two or more elements which are integrally formed are formed as one single part. This does not exclude that any other components are additionally manufactured and mounted to said integrally formed part. By integrally forming the respective one of the first and second locking members with said plastic carrier connected to the external cutting member, a stable form-locking effect can be provided and an efficient manufacturing of the shaving unit, in particular the external cutting member, is possible.

Still further it is preferred that the housing comprises a base portion and, for each cutting unit, a respective skin supporting member surrounding the external cutting member, wherein in each cutting unit the respective one of the first and second locking members connected to the housing is connected to the respective skin supporting member. According to this embodiment, the locking system effects a locking engagement of the external cutting member in relation to a skin supporting member surrounding said external cutting member. The skin supporting member may comprise a gliding surface adapted to assist a smooth gliding of the shaving unit over the skin of the user.

The shaving unit may be further improved in that said external cutting member and said housing are detachable from each other and can be mounted to each other after having been detached from each other, wherein said external cutting member is locked by said locking system in a respective one of said N1 predefined angular positions in relation to the housing with respect to said axis of rotation, wherein said locking system is adapted to effect a relative rotational movement of said external cutting member relative to said housing about said axis of rotation in the course of such mounting of said external cutting member to said housing if the external cutting member is not positioned in any of said N1 predefined angular positions relative to the housing with respect to said axis of rotation, wherein by said rotational movement the external cutting member is moved out of any angular position beside said N1 predefined angular positions of said external cutting member relative to said housing with respect to said axis of rotation into said respective one of said N1 predefined angular positions. According to this embodiment, the locking system provides a discrete number of locked angular positions of the external cutting member to the housing. The user may initially position the external cutting member in any angular position when assembling the shaving unit. If the user exactly applies one of the N1 predefined angular positions, the external cutting member will be immediately locked in exactly said angular position applied by the user upon assembling the shaving unit. If, however, the user does not exactly apply the external cutting member in any of the N1 predefined angular positions but applies the external cutting member in a shifted angular position not matching one of said the N1 predefined angular positions, the locking system will effect a rotational movement between said external cutting member and the housing out of said non-matching angular position. By this, the external cutting member is rotated about the axis of rotation into one of said the N1 predefined angular positions. Thus, according to this embodiment, the locking system is adapted to effect an angular self-adjustment of the external cutting member versus the housing and, thereby, assist the user to find a matching locked angular position about the axis of rotation upon assembling of the shaving unit. It is preferred that the locking system is adapted to effect said shifting rotational movement of the external cutting member relative to the housing about said axis of rotation out of any angular position of the external cutting member relative to the housing not correlating to one of the N1 predefined angular positions. By this, a misalignment of the external cutting member with no anti-rotation locking is completely prevented. The shifting may be effected by e.g. inclined or curved surfaces incorporated in the locking system which effect such rotational movement in the course of assembly of the shaving unit.

It is further preferred that each of the N1 first arresting elements is an indentation provided in an annular surface of the first locking member extending perpendicularly to the axis of rotation, and that each of the N2 second arresting elements is a protrusion provided on the second locking member and configured and arranged to be engageable with a respective one of the N1 indentations in any of the N1 angular positions of the external cutting member by a motion of the external cutting member relative to the housing in a direction parallel to the axis of rotation during assembly of the cutting unit According to this embodiment, the locking system provides the locking function by an indentation (like a recess) and a protrusion engaging each other in a form-locking function. To provide said plurality of at least eight distinct and different angular positions, either a plurality of recesses or a plurality of protrusions is provided on one of the two locking members. Generally, one single protrusion may interact with a plurality of recesses and, in such case, a number of eight recesses may provide eight different angular positions. In the same way, a number of eight protrusions being positioned such as to simultaneously engage a number of eight recesses will allow positioning the external cutting member in eight different angular positions in relation to the housing, since said recesses and protrusions are distributed with even angular displacement to each other. The first and the second locking members are engaged via an axial motion relative to each other along the axis of rotation. This facilitates mounting the two locking members to each other from the top of the shaving unit with a downward movement effecting the locking engagement.

In this embodiment, it is particularly preferred that said locking system comprises an inclined surface and a counteracting surface which are oriented such as to effect said rotational movement if pressed against each other, wherein said pressing of said inclined surface and said counteracting surface preferably is effected by said mounting of said external cutting member to said housing. By this embodiment, the relative rotational movement of the external cutting member relative to the housing is effected by an inclined surface and a counteracting surface of the locking system like e.g. a tooth-like pattern with sharp teeth of e.g. a triangular geometry. In particular, the indentation and the protrusion may be triangular. This significantly facilitates the assembling of the shaving unit for the user and effects a safe locking of the external cutting member.

In an alternative embodiment, each of the N1 first arresting elements is an indentation provided in a cylindrical surface of the first locking member arranged concentrically relative to the axis of rotation, and each of the N2 second arresting elements is an elastic spring element provided on the second locking member and configured and arranged to be engageable with a respective one of the N1 indentations in any of the N1 angular positions of the external cutting member by a biasing force of said spring element in a radial direction relative to the axis of rotation. According to this embodiment, a radial movement of the second arresting element versus the first arresting element provides the locking effect. The elastic spring element may be formed by a plastic bending portion provided at the second locking member, or a metallic spring mounted to the second locking member and generating a biasing force providing said locking effect.

In this embodiment it is preferred that the elastic spring element is a blade spring having a main direction of extension in a tangential direction relative to the axis of rotation, wherein the indentation has a first side wall having a main direction of extension in a radial direction relative to the axis of rotation and a second side wall having a main direction of extension in a tangential direction relative to the axis of rotation, and wherein each of the N2 second arresting elements is configured and arranged:

to prevent rotation of the external cutting member relative to the housing in said rotational direction by abutment of the blade spring with the first side wall of said respective one of the N1 indentations in any of said N1 angular positions of the external cutting member; and to allow rotation of the external cutting member relative to the housing in a direction opposite to said rotational direction by a sliding motion of the blade spring along the second side wall of said respective one of the N1 indentations in any of said N1 angular positions of the external cutting member. According to this configuration the locking system provides a ratchet-like function with a locking effect being established between the external cutting member in either a clockwise or anti-clockwise direction and a non-locking effect in the respective other anti-clockwise or clockwise direction. This embodiment further allows accommodation of the locking system in a small space sideways of the external cutting member or below the external cutting member.

It is further preferred that the housing comprises, for each cutting unit, a respective skin supporting surface surrounding the external cutting member, wherein the plurality of hair-entry openings is provided in a skin contacting surface of the external cutting member which protrudes relative to the skin supporting surface in an axial direction parallel to the axis of rotation over an exposure distance, and wherein the shaving unit comprises, for each cutting unit, a supporting structure for supporting the external cutting member relative to the housing in at least said axial direction, said supporting structure defining at least a minimum value of said exposure distance and being configured and arranged such that said minimum value is dependent on the angular position of the external cutting member about the axis of rotation relative to the housing. According to this embodiment, the angular position of the external cutting member relative to the housing provides for a level adjustment mechanism for adjusting said exposure distance of said skin contacting surface relative to said skin supporting surface, wherein by the exposure distance may be adjusted by adjusting the angular position of the external cutting member relative to the housing during assembly of the shaving unit. In this embodiment said first and said second locking members may be rotatable relative to each other about said axis of rotation, wherein in a first angular position of said first locking member relative to said second locking member said skin contacting surface has a first minimum exposure distance relative to said skin supporting surface along said axis of rotation, and wherein in a second angular position of said first locking member relative to said second locking member said skin contacting surface has a second minimum exposure distance relative to said skin supporting surface along said axis of rotation, which is different from said first distance.

According to this embodiment, a further advantage associated with the variable angular positioning of the external cutting member relative to the housing is achieved. The hair to be cut by the shaving unit shall enter through the hair entry openings in the external cutting member. To achieve this, a skin contact of the external cutting member is provided, and the convenient guiding and sliding of the shaving unit across the skin of the user is improved by a skin supporting surface provided at the housing. This skin supporting surface may fully surround the skin contacting surface of the external cutting member or may surround said skin contacting surface only in a limited angular range of less than 360°. By this, the skin supporting surface facilitates the gliding of the shaving unit over the skin of the user.

In such an arrangement, the skin contacting surface of the external cutting member protrudes relative to the skin supporting surface over a particular exposure distance. In general, the cutting efficiency is improved by increasing said exposure distance, while the cutting efficiency decreases by decreasing said exposure distance. On the other hand, a more convenient and comfortable shaving procedure is provided by decreasing said exposure distance, and the shaving procedure becomes less convenient and less comfortable by increasing said exposure distance. Thus, the balance between the efficiency and degree of comfort of the shaving procedure in influenced by said exposure distance.

Having found this relation of balanced functions, the inventors sought to allow an adjustment of the exposure distance of the skin contacting surface relative to the skin supporting surface to allow the user to select the balance point of efficiency and comfort of the shaving procedure. This is accomplished in this preferred embodiment by providing an exposure distance depending on the angular position of the external cutting member relative to the housing. By this, the exposure distance of the external cutting member relative to the housing may be adjusted, for example by the user by positioning the external cutting member in a selected angular position relative to the housing during assembly of the shaving unit. The external cutting member may thus be arranged in any of said N1 predefined angular positions relative to the housing, wherein each of said N1 predefined angular positions provides a different value of the exposure distance of the skin contacting surface relative to the skin supporting surface along the axis of rotation. It is understood that, in embodiments wherein the external cutting member and the internal cutting member are displaceable relative to the housing in the direction parallel to the axis of rotation against spring force provided, for example, by a drive spindle coupled to the internal cutting member for rotating the internal cutting member, the supporting structure is arranged to support the external cutting member only in a maximum retracted position of the external cutting member relative to the housing, so that the supporting structure only defines a minimum value of the exposure distance. It is particularly preferred that the supporting structure comprises a first supporting member connected to one of the housing and the external cutting member and a second supporting member connected to the other one of the housing and the external cutting member for cooperation with the first supporting member, wherein the first supporting member comprises at least two supporting surface segments which are each inclined with respect to a tangential direction relative to the axis of rotation, and wherein the second supporting member comprises at least two abutment elements which are each configured and arranged for abutment against a respective one of the at least two supporting surface segments in the axial direction relative to the axis of rotation. In this embodiment, a rotation of the first and the second supporting members relative to each other will provide an adjustment of the exposure distance or the minimum exposure distance due to a different angular position of the abutment elements relative to the inclined supporting surface segments.

Said inclination of each of the two supporting surface segments may be embodied as a ramped or stepped surface configuration embodied at the first supporting member. According to this embodiment, two ramps or a plurality of ramp segments with a linear inclination or a stepped contour are provided at the first supporting member to effect said adjustment of the exposure distance. It is understood that the inclined surfaces may be oriented in a mainly axial direction. The stepped surface may comprise two, three or more distinct axial displacement levels to allow the user to select from two, three or more distinct exposure distances between the external cutting member and the housing.

In an embodiment, wherein the respective one of the first and second locking members connected to the external cutting member is integrally formed with a plastic carrier, it is particularly preferred that the respective one of the first and second supporting members connected to the external cutting member is integrally formed with the plastic carrier. By this, both the respective one of the first and second supporting members and the respective one of the first and second locking members are integrally formed with the plastic carrier thus allowing an easy-to-maintain one-piece-design.

Still further it is preferred that the first supporting member is connected to the housing, wherein the at least two supporting surface segments are provided in a guiding channel provided in a cylindrical inner wall of the housing surrounding the external cutting member, wherein the second supporting member is connected to the external cutting member, and wherein the at least two abutment elements engage said guiding channel. In this embodiment, said two supporting surface segments may be provided inside an annular component, in particular a ring element, such that a guiding mechanism for said relative motion to adjust the exposure distance is provided. A form-locking effect to hold the external cutting member fixed against rotation in relation to the housing about the axis of rotation may be integrally incorporated in said guiding channel. said guiding channel may comprise a contour including ramps or steps to effect the axial displacement of the external cutting member versus the skin supporting surface to adjust the exposure distance.

In a still further embodiment of the invention, wherein each of the second arresting element is formed by a blade spring such as to effect a ratchet-like function as described beforehand, it is particularly preferred that the shaving unit comprises, for each cutting unit, a user operable operating member configured and arranged to rotate the external cutting member about the axis of rotation in a direction opposite to the rotational direction of the internal cutting member. According to this embodiment, the adjustment of the exposure distance is locked in a direction along the rotational direction of the internal cutting member and an operating member, like e.g. a lever extending sideways of the external cutting member, may be operated by the user to effect a rotation of the external cutting member opposite to said rotational direction. By this rotation the user effects a change of the exposure distance.

In this embodiment, it is particularly preferred that the operating member is movable with respect to the housing in a tangential direction relative to the axis of rotation against a spring force acting in the rotational direction, wherein the operating member is coupled to the external cutting member by means of a one-way clutch structure allowing motion of the operating member relative to the external cutting member in the rotational direction. By this, a convenient actuation of the adjustment of the exposure distance of a cutting unit via a ratchet-like mechanism is incorporated into the shaving unit. A further aspect of the invention is a shaving apparatus comprising a main body accommodating a drive system and further comprising a shaving unit as described beforehand which is driven by said drive system. Such shaving apparatus provides the functional benefits of the shaving unit as described beforehand. The shaving unit may be permanently coupled to the main body or may be releasably coupled to the main body. It shall be understood that a preferred embodiment of the present invention can also be any combination of the dependent claims or above embodiments with the respective independent claim.

These and other aspects of the invention will be apparent from and elucidated with reference to the embodiments described hereinafter.

BRIEF DESCRIPTION OF THE DRAWINGS

In the following drawings:

FIG. 10 shows a perspective bottom view of locking system components of a fifth embodiment of a shaving unit according to the invention, FIGS. 11A, B show a schematic view of a locking system and exposure adjustment means of the fourth embodiment of the shaving unit.

DETAILED DESCRIPTION OF EMBODIMENTS

Figure 1:
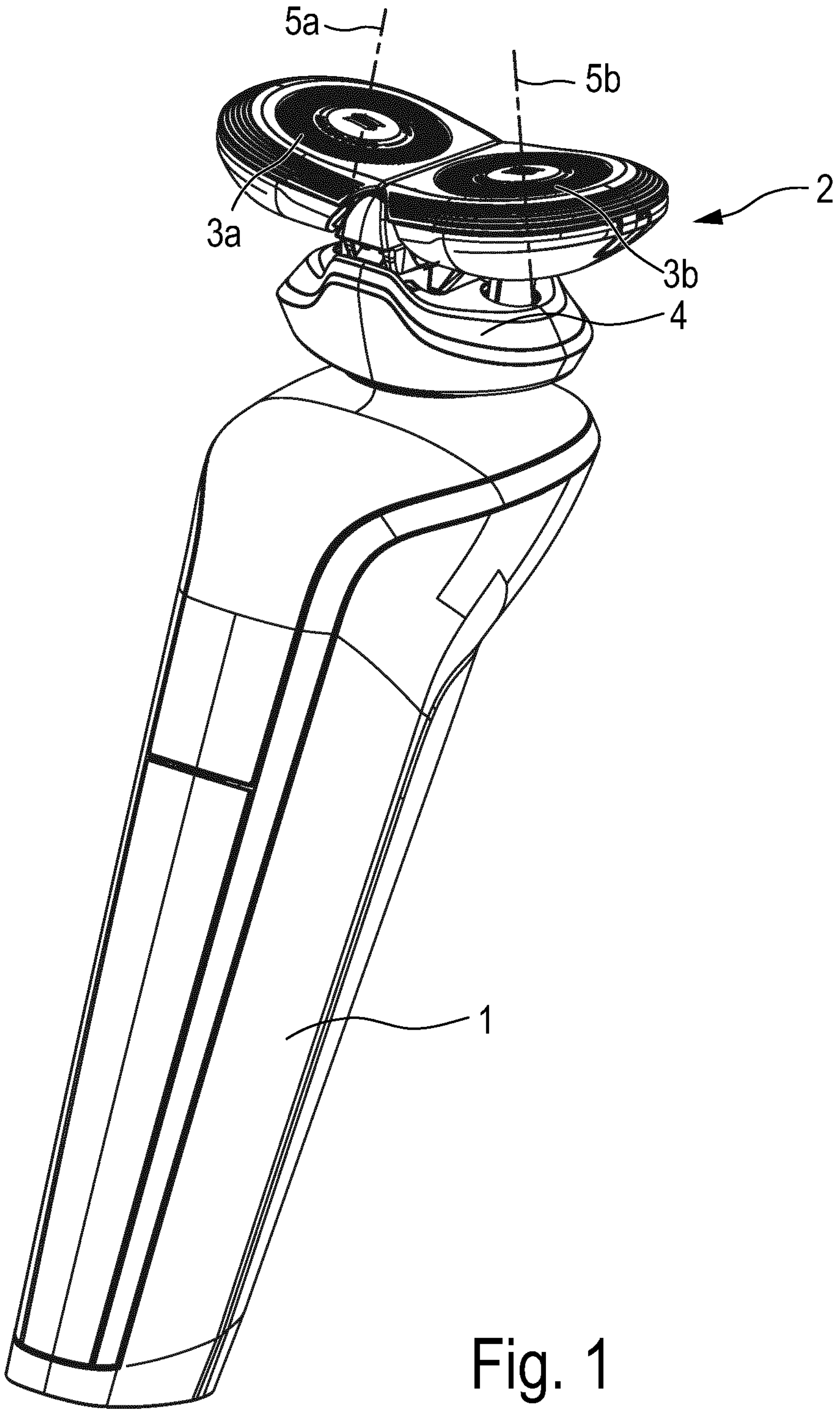
FIG. 1 shows a perspective view of a shaving apparatus according to the invention.

FIG. 1 shows a rotary shaving apparatus according to the invention, comprising a main body or handle portion 1 and a first embodiment of a shaving unit 2 according to the invention, which is detachable from the main body 1 and/or is hinged to the main body 1. Two rotary cutting units 3*a*, 3*b*, also denoted shaving heads, are arranged in the shaving unit 2, each having an external cutting member 4 with hair trap openings s-and an internal cutting member 30 (FIG. 2) with cutter elements, which can be driven into rotation with respect to the external cutting member 4 about three axes of rotation with one axis of rotation associated to each cutting unit. The cutting units 3*a*, 3*b* may be pivotable about a single axis or multiple axes to be able to follow the contour of the skin of the user such as to provide comfortable shaving. Thus, the axes of rotation may change their orientation with respect to the main body 1 upon tilting of the cutting unit 3*a*, 3*b*. This change of orientation may be synchronized between the cutting units or may be independently for each of the cutting units. The internal cutting member is driven by a drive unit like an electric motor accommodated in the main body 1 which may further comprise various components like e.g. a rechargeable battery, a drive unit, a control unit and an interface for controlling and charging the shaving apparatus. Below the rotary cutting units a gear component may be provided, wherein the driving force of the drive unit inside the main body 1 is transmitted and distributed to the cutting units. It should be understood that two (as depicted in FIG. 1), three, four or more such cutting units could be provided at the shaving unit as well as only one single cutting unit could be comprised in the shaving unit.

Figure 2:
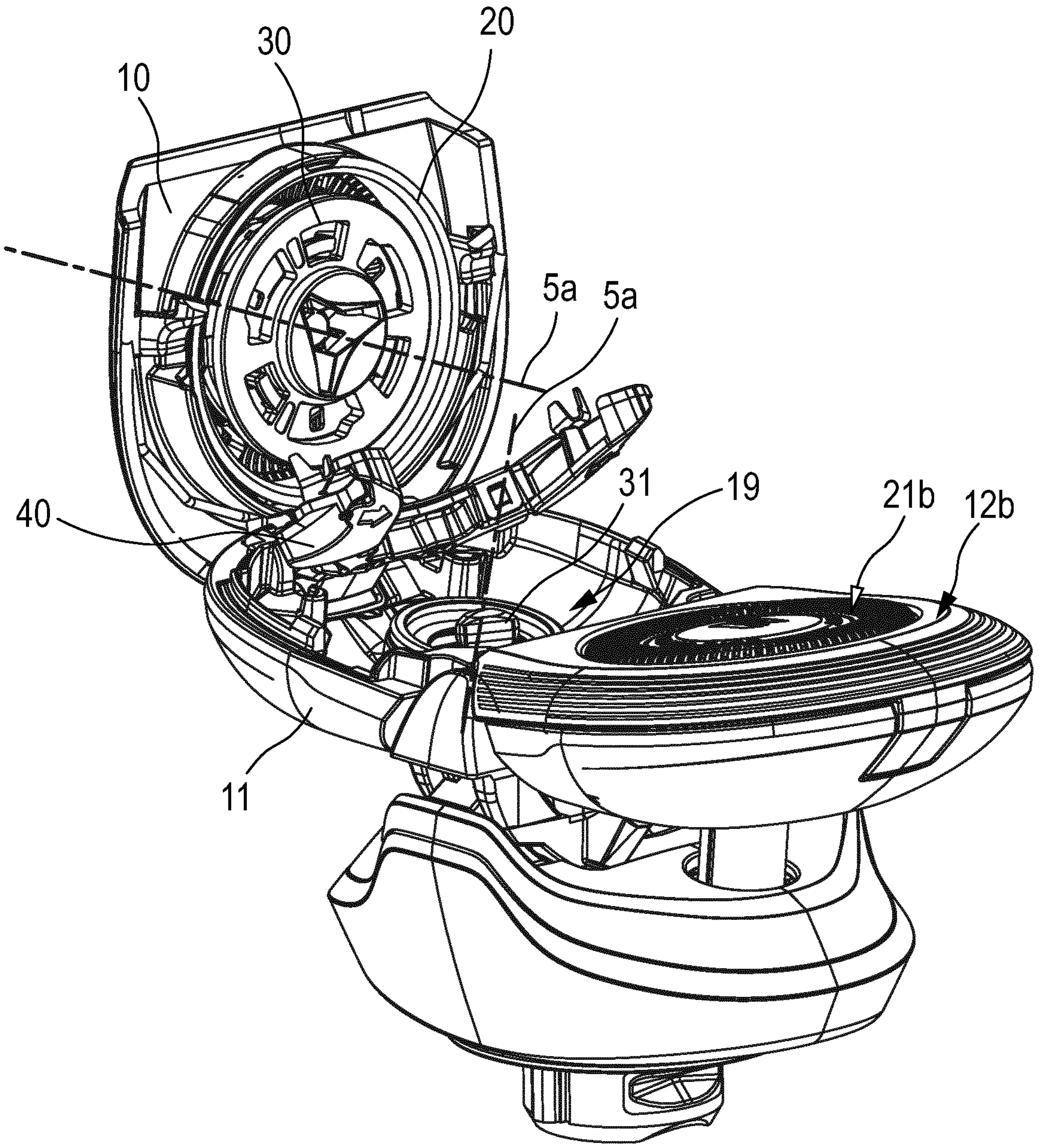
FIG. 2 shows a perspective lateral top view of a first embodiment of a shaving unit according to the invention comprised by the shaving apparatus of FIG. 1, with one cutting unit being opened.

Making reference to FIG. 2, the first embodiment of the shaving unit 2 of the shaving apparatus is shown in detail, wherein the left cutting unit 3*a* is shown in an opened position. As can be seen, the cutting unit 3*a* is mounted in a shaving unit comprising an upper housing part 10 and a bottom housing part 11, which are connected via a hinge-type connection allowing the upper housing part 10 to be pivoted about an axis in relation to the bottom housing part 11 such as to allow access to the interior of the housing 10, 11.

An external cutting member 20 is mounted to the upper housing part 10. The external cutting member 20 is formed as a circular cap with an upper skin contacting surface 21*b* as can be seen from the right, non-opened cutting unit in FIG. 2. The external cutting member 20 is mounted to the upper housing part 10 and locked against rotation about the axis of rotation 5*a* by a locking system. The upper housing part 10 defines a skin supporting surface 12*b* as can be seen in the right hand cutting unit of FIG. 2. This skin supporting surface 12*b* circumscribes the skin contacting surface 21*b* of the external cutting member. In the skin contacting surface 21*b*, a plurality of radially extending slots are provided in a circular arrangement. These are the hair entry openings forming a circular shaving track.

Still further, an internal cutting member 30 is positioned adjacent to the external cutting member and is able to rotate about the axis of rotation 5*a* in relation to the external cutting member. The internal cutting member 30 comprises a central coupling recess of a triangular shape to couple with a spindle head 31 of the drive gear. Via this spindle head 31 the internal cutting member is driven into rotation and at the same time is able to follow a pivoting movement of the external cutting member when following the contour of the skin.

The bottom housing part 11 comprises an annular hair collection chamber 19. A holder 40 is pivotally mounted to the bottom housing part 11 to support and hold the external cutting member 20 in its position at the upper housing part 10.

Figure 3:
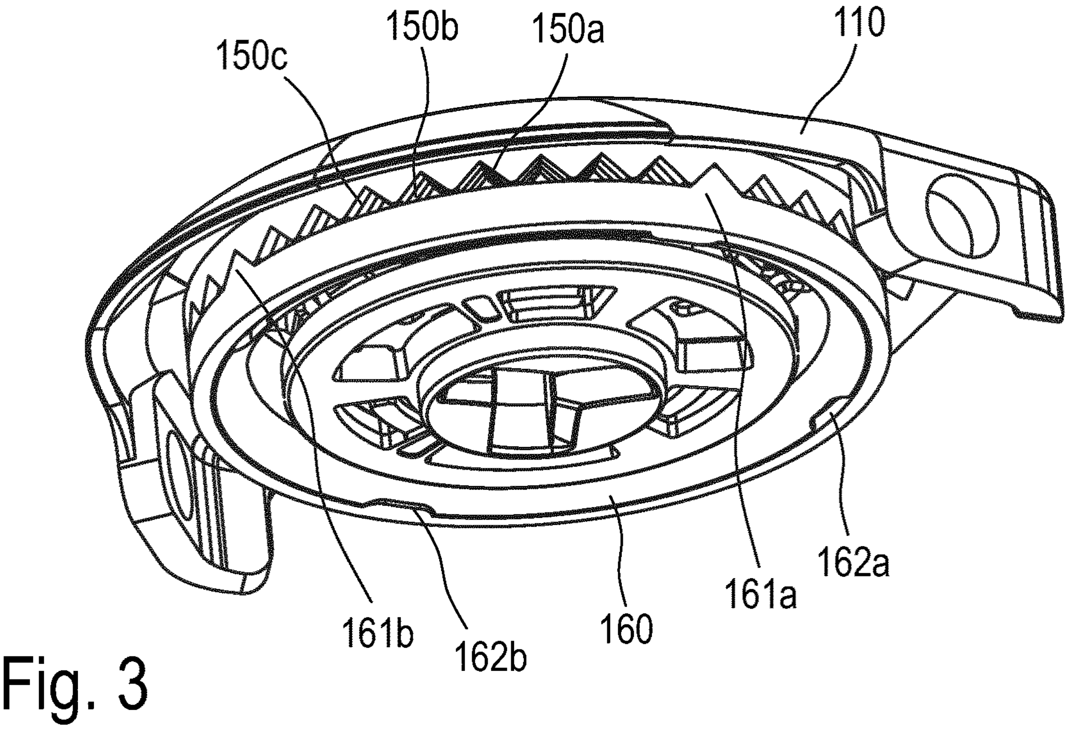
FIG. 3 shows a perspective lateral bottom view of a housing component and a locking system component of the first embodiment of the shaving unit.

Making reference now to FIG. 3, an upper housing part 110 and a second locking member 160 of the locking system of the first embodiment of the shaving unit according to the invention is shown in a perspective lateral bottom view. As can be seen, the upper housing part 110 comprises a plurality of integrally formed indentations or recesses 150*a, b, c*, . . . arranged in an annular arrangement at the outer periphery of the upper housing part. These indentations face downward towards the bottom housing part (not shown). These indentations form a plurality of first arresting elements and said plurality of first arresting elements form a first locking member of the locking system.

The indentations 150*a, b, c*, . . . are formed as triangular indentations with a base of the triangle forming the opening of the recess and the tip of a triangle forming the bottom end of the indentation. As can be seen, the indentations 150*a, b, c* . . . are arranged in direct neighborhood to each other such that between two adjacent recesses, a triangular protrusion is formed, said protrusion having a triangular geometry with the tip facing towards the bottom housing part.

The second locking member 160 is ring-shaped and is provided as a separate plastic carrier. It forms in connection with the first locking member and the indentations 150*a,b,c*, . . . formed at this first locking member the locking system for preventing rotation of the external cutting member relative to the housing. The second locking member 160 comprises four protrusions disposed about the second locking member in an angular distance of 90° to each other such that the protrusions are evenly distributed along the periphery of the ring-shaped component. The protrusions form second arresting elements and face towards the upper housing part 110. The protrusions are formed as triangular protrusions with the tip facing towards the upper housing part 110. By this, the protrusions of the second locking member match exactly with the indentations formed integrally as first locking member at the upper housing part 110.

The second locking member may be positioned in a large number of predefined angular positions relative to the second locking member at the upper housing part 110 with respect to the axis of rotation 5*a* with the protrusions being form-locked in any of the indentations 150*a,b,c*, . . . formed in the upper housing part. By this, the second locking member may easily be mounted to the first locking member in such form-locking engagement, since no particular single orientation or angular position must be adjusted or maintained for such assembling process. Still further, by the assembling process comprising insertion of the triangular protrusion into the triangular indentation, a slight angular misalignment will be automatically adjusted by the locking system such that the protrusions are guided by themselves into a full form-locking engagement into the indentation by a guiding function of the flanks of triangular geometry.

The ring-shaped second locking member 160 further comprises four radially inward protruding teeth 162*a,b*, which allow fixing the ring-shaped second locking member 160 to the external cutting member. With the ring-shaped second locking member fixed to the external cutting member, these teeth prevent rotation of the ring-shaped second locking member 160 in relation to the external cutting member and thus, the external cutting member can be form-locked against rotation about the axis of rotation 5*a* by said form-locking engagement of the protrusions 161*a,b*, . . . inside the indentations 150*a,b,c*, . . .

Figure 4:
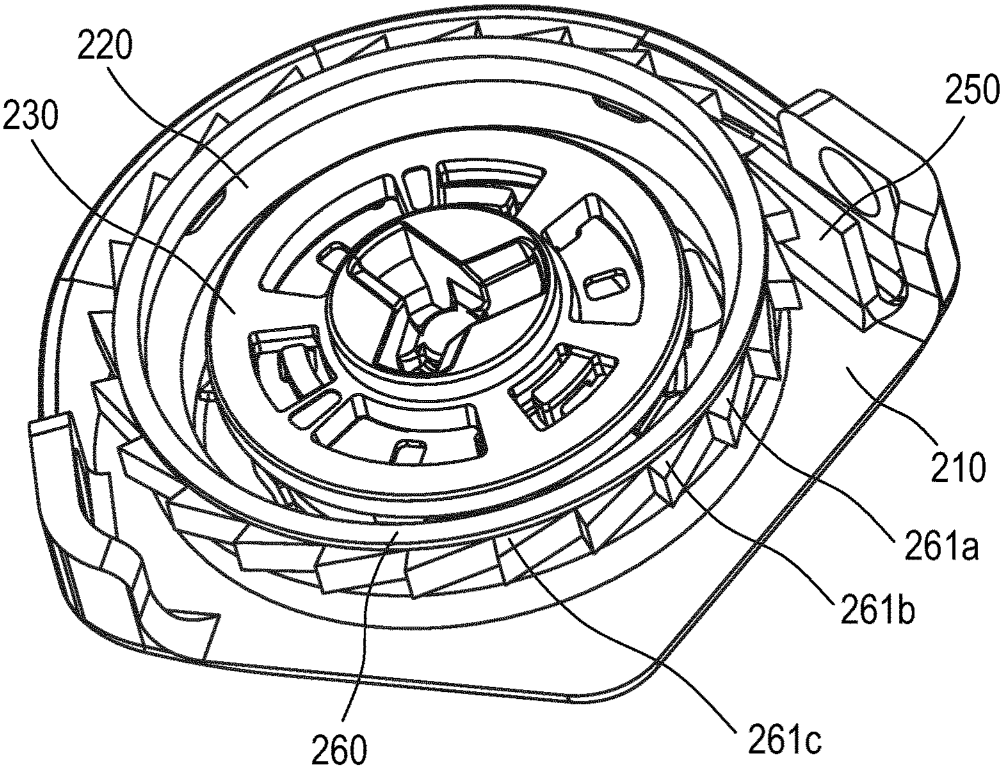
FIG. 4 shows a perspective bottom view of a housing component and a locking system component of a second embodiment of the shaving unit according to the invention.

FIG. 4 shows a bottom perspective view of a second embodiment of the shaving unit according to the invention. In this embodiment, a ring-shaped first locking member 260 is employed and firmly attached to the external cutting member 220 being placed in the upper housing part 210. The ring-shaped first locking member comprises a plurality of more than eight radially extending indentations or notches 261*a, b, c* forming first arresting elements. As can be seen, the indentations 261*a, b, c* have a triangular geometry similar to a sawtooth-like pattern. Thus, this design provides a first, short side of each indentation or notch lying in a radially extending plane with respect to the axis of rotation or in a plane having a small angle to such radially extending plane. Further, a long side of the triangular geometry lies in a plane oriented in a small angle to a tangential plane to the ring-shaped first locking member, i.e. having a main component in a circumferential direction.

A second locking member 250 integrally formed at the upper housing part 210 engages the indentations 261 *a, b, c* of the ring-shaped first locking member 260. As can be seen, the second locking member 250 comprises a protrusion forming a single second arresting element acting against the short side of one of the triangular indentations 261*a, b, c* and hereby locks the first locking member and the external cutting member attached thereto against a clockwise rotation when seen from the bottom according to FIG. 4. This locking against the clockwise rotation is functionally relevant because the internal cutting member 230 is driven into a corresponding clockwise rotation and thus may impart a torque into such clockwise direction to the external cutting member.

The first locking member 260 may rotate counter-clockwise by flexible bending of the second locking member 250 in a radial outward direction. This outward bending is caused by the long side of the triangular indentations forming the first arresting elements. By this, a ratchet-like mechanism is provided by the interaction of the indentations 261*a-c* and the second locking member 250. Further, it can be seen that the first locking member may be form-locked against rotation in a clockwise direction in a total of twenty-four angular positions corresponding to the number of twenty-four indentations 261*a, b, c*, . . . thus making it quite easy for a user to assemble this arrangement with a safe form-locking of the external cutting member.

Figure 5:
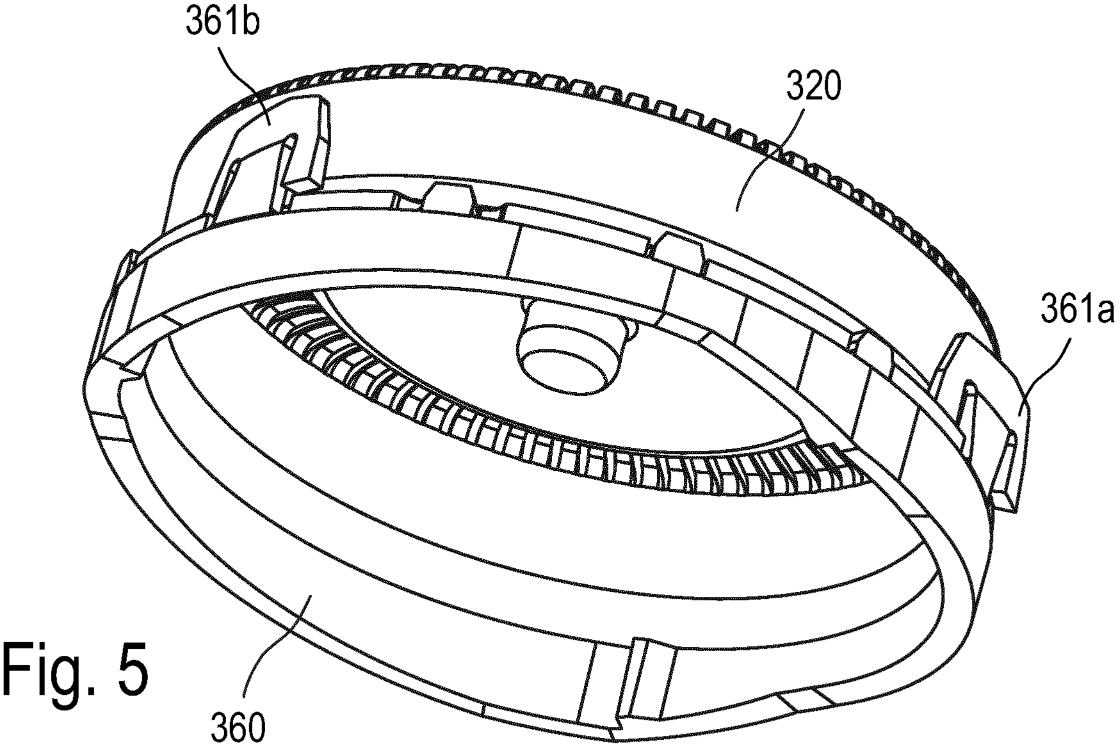
FIG. 5 shows a perspective lateral bottom view of a housing component and a locking system component of a third embodiment of the shaving unit according to the invention.
Figure 6:
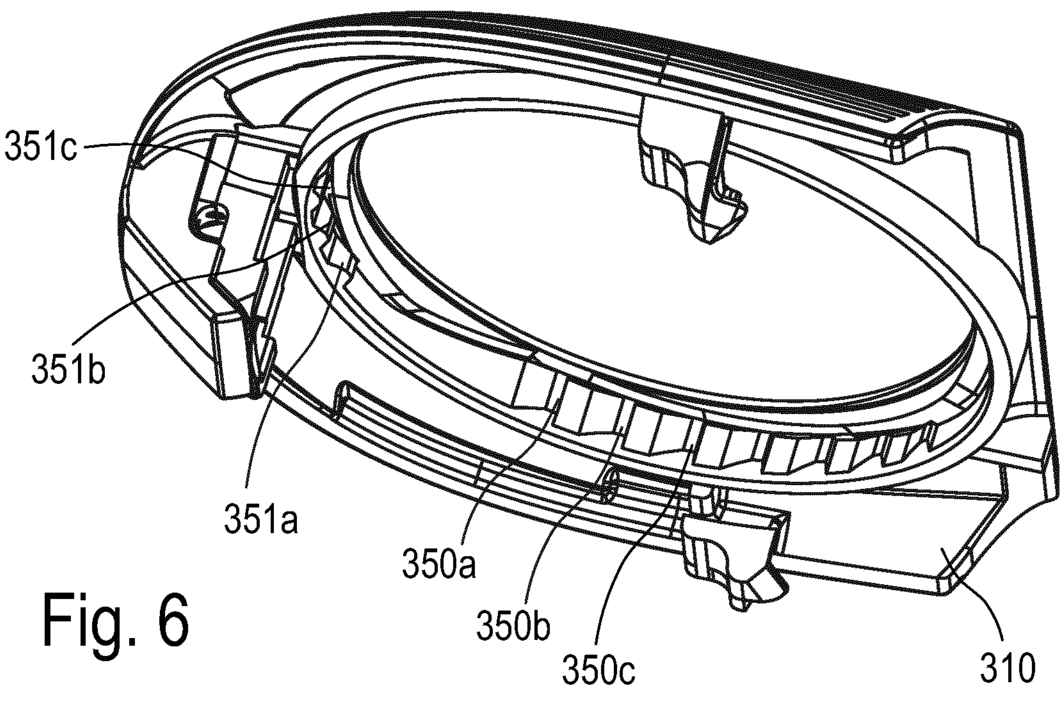
FIG. 6 shows a perspective lateral bottom view of a housing component and a locking system component of the third embodiment of the shaving unit.

FIG. 5 and FIG. 6 show bottom perspective views of the locking system of a third embodiment of a shaving unit according to the invention. A ring-shaped second locking member 360 is attached to the external cutting member 320 via a form-locking clipping engagement. The ring-shaped second locking member 360 comprises three radially protruding tabs 361*a,b,c* which are flexible for an elastic movement in a radially extending direction. The flexible tabs 361*a, b*, . . . form protrusions acting as second arresting elements and engage with a first locking member having a toothed pattern 350, 351, 352 in three segments of a ring-shaped enclosure circumscribing the opening in the upper housing part 310 taking up the external cutting member. Each of the three toothed segments in the second locking member comprises a plurality of indentations 350*a,b,c*, 351*a,b,c*. By this, each of the tabs 361*a, b* may engage one of said plurality of indentations and thus, the external cutting member may be positioned inside the upper housing part 310 in a plurality of different angular positions. In this embodiment, a total of eight different angular positions is available corresponding to the eight protrusions in each of the toothed pattern 350*a, b, c*, . . . 351*a,b,c*, . . . .

Figure 7:
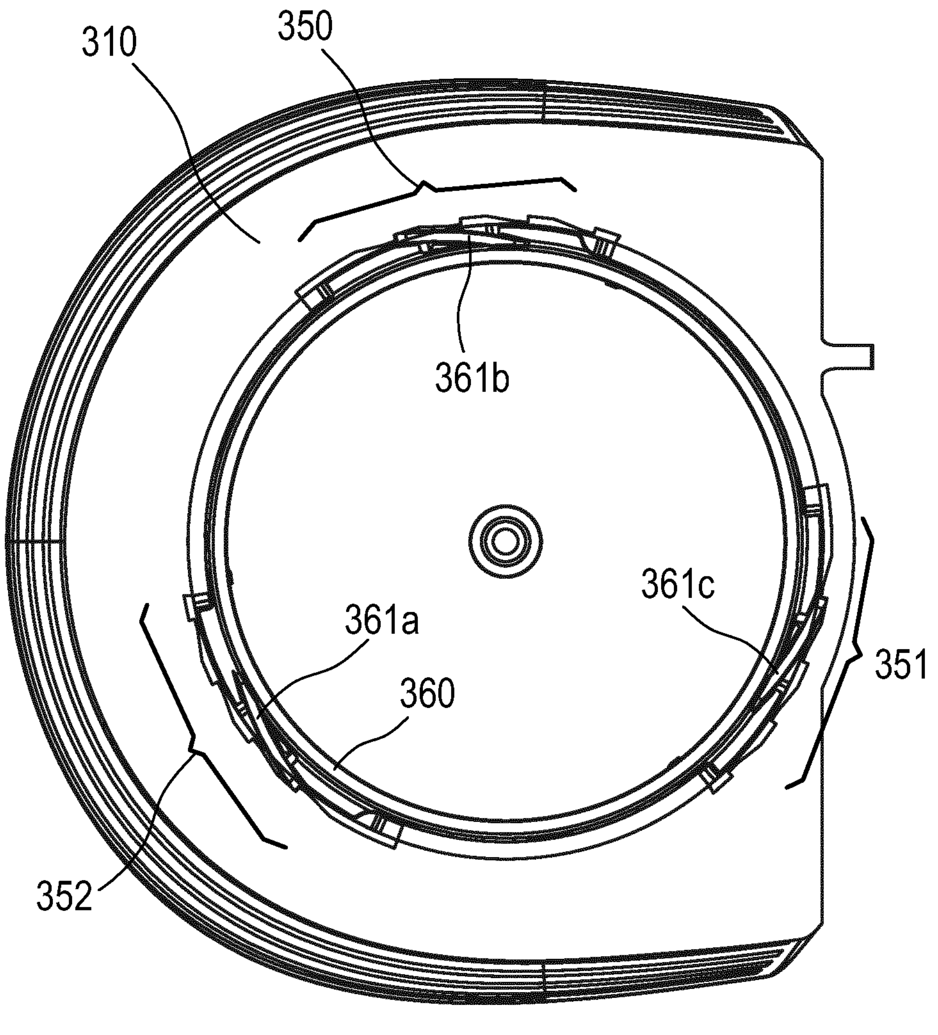
FIG. 7 shows a bottom view of the components of the third embodiment of the shaving unit.
Figure 8:
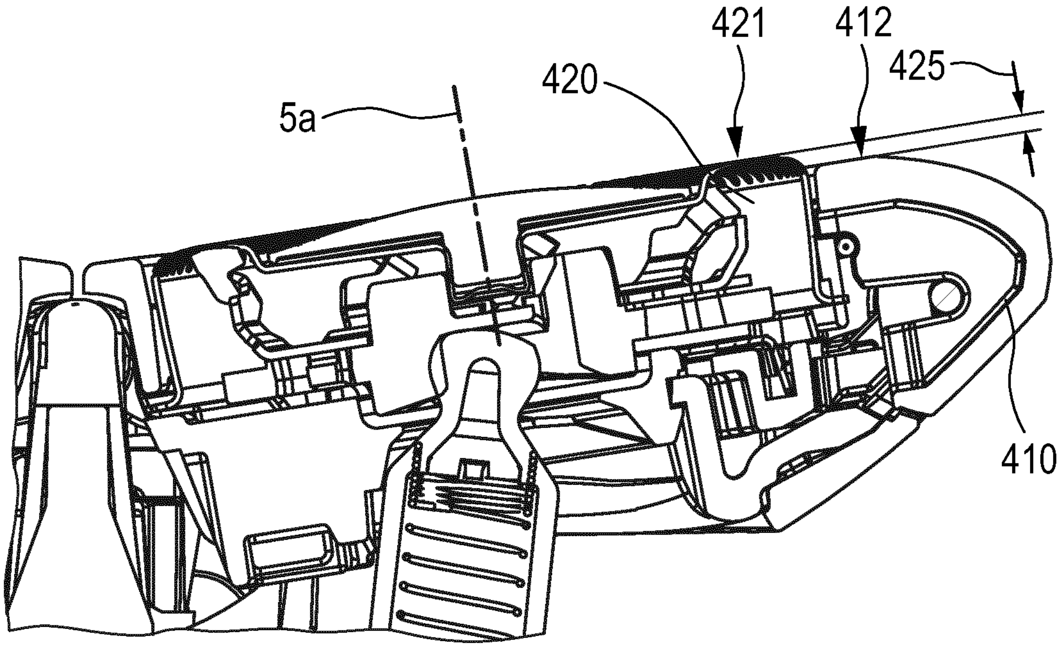
FIG. 8 shows a sectional lateral view of a fourth embodiment of a shaving unit according to the invention.

FIG. 7 shows a top view of the third embodiment with the ring-shaped second locking member 360 shown inside the opening of the upper part housing 310, wherein the external cutting member is not shown in this embodiment for better view of the locking function.

Reference is being made now to FIGS. 8-16. An additional functionality of the locked external cutting member inside the housing is explained. As can be seen in the sectional view of FIG. 8 relating to a fourth embodiment of a shaving unit according to the invention, the upper part of the housing 410 defines an angular skin supporting surface 412 surrounding a skin contacting surface 421 along a shaving track of the external cutting member 420 ("cap"). An exposure distance 425 ("cap exposure") of the skin contacting surface 421 versus the skin supporting surface 412 is defined as the axial displacement in the direction of the axis of rotation 5*a*. This exposure distance 425 is a characteristic defining the balance of efficiency versus comfort of the shaving action. Whilst a large positive protruding exposure distance 425 of the skin contacting surface 421 over the skin supporting surface 412 will produce an efficient shaving function with less comfort function, a small positive exposure distance 425 or a flush arrangement of the skin supporting surface 412 and the skin contacting surface 421 or even a negative exposure distance 425 with the skin contacting surface lying below the skin supporting surface will produce an increased comfort function of the shaving procedure with reduced shaving efficiency.

Figure 9:
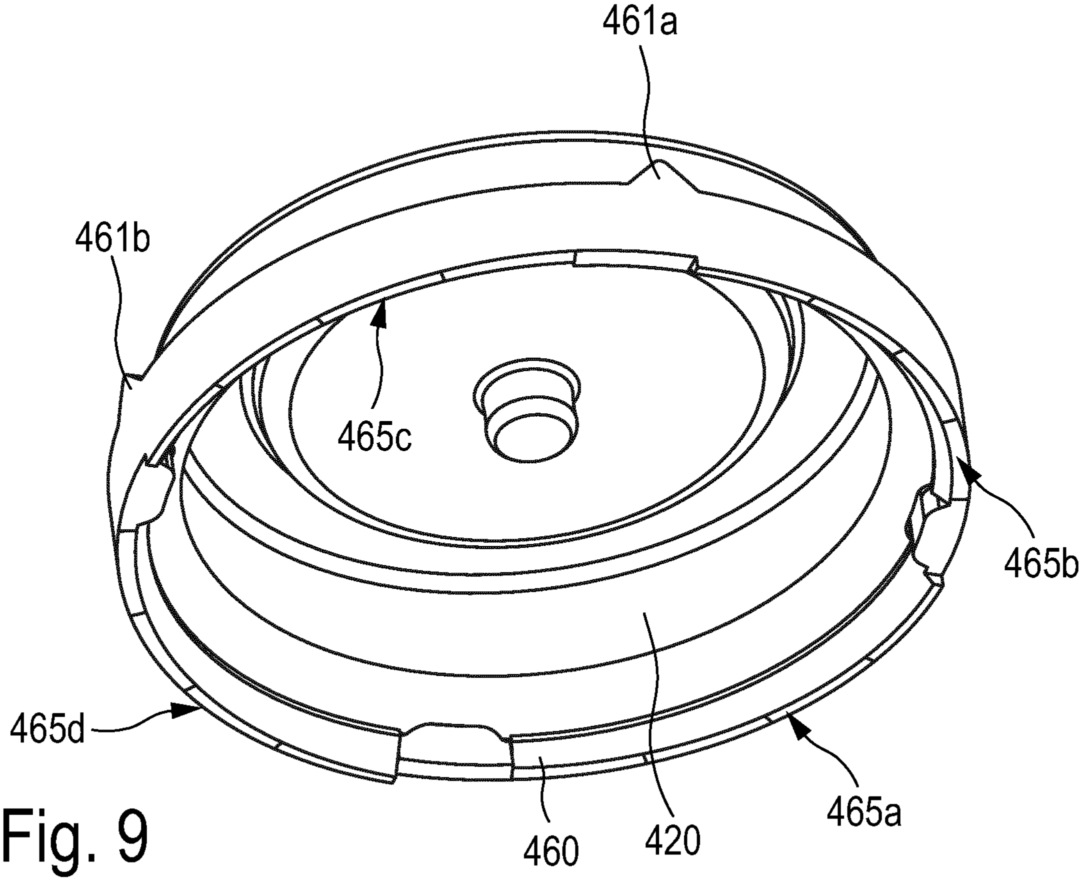
FIG. 9 shows a perspective bottom lateral view of a locking system component of the fourth embodiment of the shaving unit.

The exposure distance 425 may be set according to the personal preferences of the user. As can be seen in FIG. 9, a ring-shaped second locking member 460 having four distinct protruding triangular protrusions 461*a, b*, . . . similar to the protrusions 161*a, b*, . . . is provided in this embodiment to effect the form-locking function for anti-rotating locking of the external cutting member 420. The ring-shaped second locking member 460 of FIG. 9 is different from the ring-shaped second locking member 160 of FIG. 3, in that the axial bottom face is not formed as an even axial annular face. Instead, this axial face is formed by four ramp segments 465*a, b, c, d*. These ramp segments 465*a-d* define a sloped geometry on the bottom side of the second locking member 460.

This segmented sloped geometry is used as an abutting surface inside the cutting unit to support the external cutting member. The support may be provided by a holder, e.g. formed like the holder 40 shown in FIG. 2 or may be provided by corresponding abutting supports integrally formed at the bottom part of the housing. Such abutting support posts are schematically shown in FIG. 11A, B as posts 445. Upon mounting the second locking member 460 to an upper housing part 110, as shown in FIG. 3, the user may select a specific angular position of the second locking member 460 versus the housing 110. By this, support posts provided to abut the ramp surfaces 465*a-d* will define a specific axial displacement of the external cutting member 420 attached to said ring-shaped second locking member 460 in relation to the housing 410. This axial displacement will depend on the position of the posts along the periphery of the abutting ramp surfaces 465*a-d*. By this, the user may adjust the distance 425 and thus the degree of efficiency versus comfort of the shaving function.

A single or each of the four ramp segments 465*a, b, c, d* is divided into a plurality of differently colored segments. The colors are ranging from green to red. By this, the user may be given a color signal through a window or opening or the like about the degree of cap exposure.

The specific interaction and functionality of adjusting the cap exposure distance is schematically shown in FIGS. 11A, B shows a first supporting member 464 comprising at least two supporting surface segments 465*a*, 465*b*, 465*c*, 465*d* (FIG. 9) and a second supporting member 440 comprising at least two abutment elements 445. As can be seen in FIG. 11A, the protrusion 461*a* may be positioned such that the abutting post 445 is positioned approximately in the middle of the ramp segment, thus effecting a first height level of the skin contacting surface 421. FIG. 11B shows a different positioning of the protrusion 461*a* in a different indentation at the upper part housing. In this position, the post abuts the ramp surface close to the maximum ramp level, thus producing a raised level of the skin contacting surface 421'. The difference between the two levels is shown in FIG. 11A, B and labelled as "h". The maximum difference of the level of the skin contacting surface is shown as "h." being the difference of the minimum ramp level to the maximum ramp level. Positioning the protrusion 461*a* at the minimum ramp level will effect a minimum exposure distance.

FIG. 10 shows a ring-shaped first locking member 560 of a fifth embodiment of a shaving unit according to the invention, which is similar to the ring-shaped first locking member shown in FIG. 4, wherein the form-locking indentations 561*a, b, c*, . . . extend in a radial direction. This first locking member 560 comprises a bottom ring-shaped abutting surface similar to the second locking member 460 of FIG. 9 having 4 ramp segments 565*a, b, c, d* with a ramp extending in an axial direction with respect to the axis of rotation 5*a* of the external cutting member 520. Again, a color code from green to red is applied such that a color signal of the cap exposure distance can be given to the user.

Figure 12:
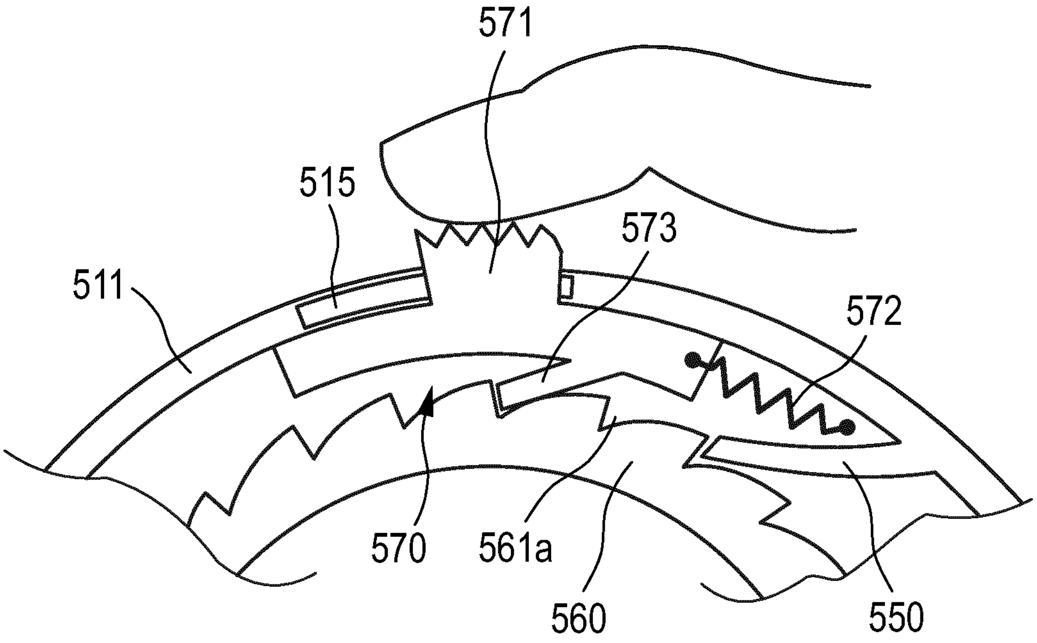
FIG. 12 shows a schematic view of a manual exposure adjustment means of the fifth embodiment of the shaving unit.

FIG. 12 shows a mechanism for adjusting the height level of the skin contacting surface by rotating the ring-shaped first locking member 560 in the fifth embodiment of the shaving unit. To effect such rotation, a ratchet-like element 570 is provided radially outward of the ring-shaped first locking member 560. This ratchet-like element 570 has a handle portion 571 protruding through an opening 515 in the housing 511 of the shaving unit, whereby this handle portion 571 of the ratchet-like element 570 can be actuated by a finger of the user from outside the cutting element. The ratchet-like element is biased into a position abutting one end of the opening 515 by a spring 572. The user may move the ratchet-like element 570 in a counter-clockwise direction about a certain angular range defined by the angular extension of the opening 515. Upon such movement in a circumferential direction, a flexible tab 573 forming a second arresting element integral with the element 570 engages the short flank of the triangular indentations 561*a, b, c* of the ring-shaped locking element 560 and rotates the ring-shaped first locking member 560 in a counter-clockwise direction. A further flexible tab 550 mounted to the housing 511 forms an additional protrusion acting as a second arresting element. This tab 550 will effect a locking of the ring-shaped locking element in the counter-clockwise rotated position effected by such movement of the ratchet-like element. The user may thus move the ratchet-like element 570 clockwise following the force of the spring 572 back to its initial position without the ring-shaped locking element following this movement. By this, the first locking member 560 can be rotated counter-clockwise in a stepwise fashion to effect adjustment of the level of the skin contact surface.

Figure 13:
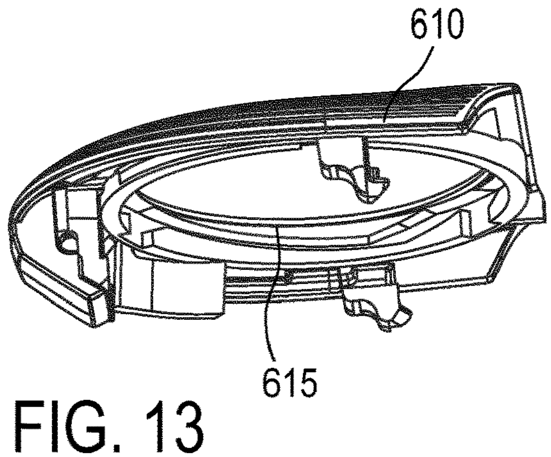
FIG. 13 shows a perspective bottom lateral view of a housing component of a sixth embodiment of a shaving unit according to the invention.
Figure 14:
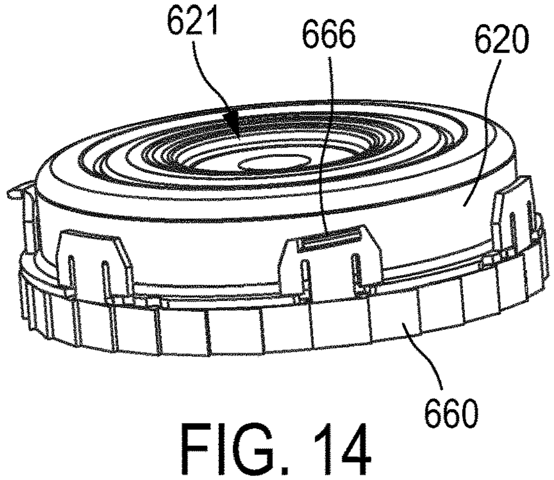
FIG. 14 shows a perspective top lateral view of locking system components of the sixth embodiment of the shaving unit.

FIGS. 13 and 14 show an exposure distance adjustment mechanism for the skin contacting surface in a sixth embodiment of a shaving unit according to the invention. In this embodiment, the ramped surface is not provided at the ring-shaped locking element, but alternatively embodied in the upper housing part 610. As can be seen, a ramped surface is defined by a guiding slot 615, formed in an inner cylindrical wall surrounding the opening in the upper housing part, which takes up the external cutting member. The external cutting member 620 is attached to a ring-shaped first locking element 660 having multiple radially extending indentations similar to the ring-shaped locking member 260 and the ring-shaped locking member 560. Further, this ring-shaped first locking member 660 comprises short rail segments 666 engaging the ramped slot 615 in the upper housing part 610. By this, a rotation of the first locking member 660 together with the external cutting member 620 will effect an adjustment of the height level of the skin contacting surface 621 by such guiding of the rail segments inside the ramped slot 615.

Figure 15:
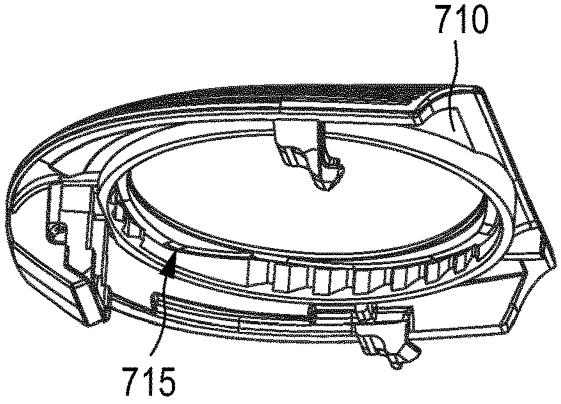
FIG. 15 shows a perspective bottom lateral view of a housing component of a seventh embodiment of a shaving unit according to the invention.
Figure 16:
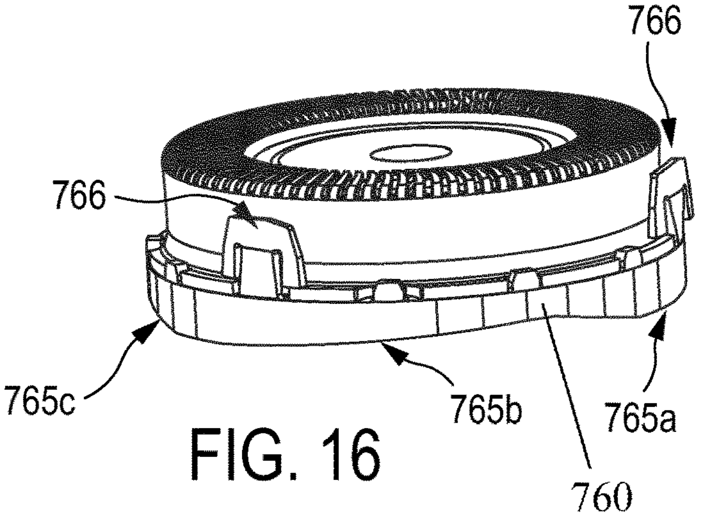
FIG. 16 shows a perspective top lateral view of locking system components of the seventh embodiment of the shaving unit.

Still further, FIGS. 15 and 16 show the components of a seventh embodiment of a shaving unit according to the invention comprising an exposure distance adjustment mechanism for the skin contacting surface relative to the skin supporting surface. In this embodiment, the locking system for locking the external cutting member against rotation is formed in a similar manner as shown in the embodiment of FIG. 6. Still further, a ramped surface is provided in the inner cylindrical wall of the upper housing part 710 as a ramped shoulder 715. Additionally, as can be seen in FIG. 16, the bottom surface of the first locking member 760 is formed by four ramp segments 765*a,b,c* similar to the ramp segments 465*a-d* of the embodiment shown in FIG. 9. The ring-shaped locking element 760 is equipped with tabs each having an axially abutting surface 766 which abuts the ramped shoulder 715 inside the upper housing part 710. In contrast to the embodiment shown in FIGS. 13, 14, this embodiment does not require a guiding slot in the form of a ramped notch engaging a rail segment, but rather uses the ramped shoulder forming a ramped axial abutting surface in the upper housing part 710. This ramp surface 715 limits the axial movement of the ring-shaped first locking member 760 in the direction upwards whilst the ring-shaped first locking member 760 is supported on the bottom side by the ramped surface 765*a, b, c*, thus limiting the axial movement in the opposite direction.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage. Any reference signs in the claims should not be construed as limiting the scope.

The invention relates to a shaving unit comprising a housing and at least one cutting unit accommodated by the housing. Each cutting unit comprises an external cutting member and an internal cutting member which is rotatable relative to the external cutting member about an axis of rotation. A locking system is configured and arranged to prevent rotation of the external cutting member relative to the housing. Said locking system comprises an annular array of N1 first arresting elements and N2 second arresting elements, wherein $N1 \geq 8$ and $1 \leq N2 \leq N1$. The N2 second arresting elements are configured and arranged to be each engageable with a respective one of the N1 first arresting elements in any of N1 angular positions of the external cutting member about the axis of rotation relative to the housing.

The invention claimed is:

1. A shaving unit comprising a housing and at least one cutting unit accommodated and supported by the housing, wherein each cutting unit comprises:

an external cutting member having a plurality of hair-entry openings provided in a skin contacting surface of the external cutting member; and an internal cutting member which is rotatable relative to the external cutting member about an axis of rotation;

wherein the shaving unit comprises, for each cutting unit, a locking system configured and arranged to prevent, during use, rotation of the external cutting member of the respective cutting unit relative to the housing at least in a rotational direction of the internal cutting member about the axis of rotation, said locking system comprising a first locking member connected to one of the housing and the external cutting member and a second locking member connected to the other one of the housing and the external cutting member for cooperation with the first locking member, wherein the first locking member comprises an annular array of N1 first arresting elements which are concentrically arranged relative to the axis of rotation with a uniform distribution about the axis of rotation and abut each other at an entire outer periphery of the one of the housing and the external cutting member, and wherein the second locking member comprises N2 second arresting elements, and wherein:

N1≥8 and 1≤N2≤N1;

the N2 second arresting elements are configured and arranged to be each engageable with a respective one of the N1 first arresting elements in any of N1 angular positions of the external cutting member about the axis of rotation relative to the housing;

each of the N2 second arresting elements is configured and arranged to prevent rotation of the external cutting member relative to the housing in said rotational direction by engagement with the respective one of the N1 first arresting elements in any of the N1 angular positions of the external cutting member, the locking system is configured to rotate the external cutting member about the axis of rotation to engage the N2 second arresting element with the N1 first arresting element to angularly self-adjust the external cutting member verses the housing by flanks of a triangular geometry of the first and second arresting elements.

2. The shaving unit as claimed in claim 1, wherein N1≥16.

3. The shaving unit as claimed in claim 1, further comprising a supporting structure for supporting the external cutting member relative to the housing, wherein the supporting structure has a first supporting member having an inclined surface, wherein the supporting structure has a second supporting member having a post that protrudes from the second supporting member, wherein the housing has a skin supporting surface surrounding the external cutting member, and wherein the exposure distance between the skin supporting surface and the skin contacting surface is adjustable by a discrete number of the N1 angular positions to lock the external cutting member at a selected exposure distance in response to changing an angular position of the external cutting member about the axis of rotation relative to the housing by rotation of the external cutting member about the axis of rotation for rotating the inclined surface over the post and engagement of the N2 second arresting elements with different ones of the N1 first arresting element of the external cutting member.

4. The shaving unit as claimed in claim 1, wherein the housing comprises a base portion and, for each cutting unit, a respective skin supporting member surrounding the external cutting member, wherein in each cutting unit the respective one of the first and second locking members connected to the housing is connected to the respective skin supporting member.

5. The shaving unit as claimed in claim 1, wherein each of the N1 first arresting elements is an indentation provided in an annular surface of the first locking member extending perpendicularly to the axis of rotation, and wherein each of the N2 second arresting elements is a protrusion provided on the second locking member and configured and arranged to be engageable with a respective one of the N1 indentations in any of the N1 angular positions of the external cutting member by a motion of the external cutting member relative to the housing in a direction parallel to the axis of rotation during assembly of the cutting unit.

6. The shaving unit as claimed in claim 5, wherein the indentation and the protrusion are triangular.

7. The shaving unit as claimed in claim 1, wherein each of the N1 first arresting elements is an indentation provided in a cylindrical surface of the first locking member arranged concentrically relative to the axis of rotation, and wherein each of the N2 second arresting elements is an elastic spring element provided on the second locking member and configured and arranged to be engageable with a respective one of the N1 indentations in any of the N1 angular positions of the external cutting member by a biasing force of said spring element in a radial direction relative to the axis of rotation.

8. The shaving unit as claimed in claim 1, wherein the housing has a skin supporting surface surrounding the external cutting member, wherein the skin contacting surface of the external cutting member which protrudes relative to the skin supporting surface in an axial direction parallel to the axis of rotation over an exposure distance between the skin supporting surface and the skin contacting surface, and wherein the shaving unit comprises, for each cutting unit, a supporting structure for supporting the external cutting member relative to the housing in at least said axial direction, the supporting structure defining at least a minimum value of said exposure distance and being configured and arranged such that said minimum value is dependent on an angular position of the external cutting member about the axis of rotation relative to the housing.

9. The shaving unit as claimed in claim 8, wherein the supporting structure comprises a first supporting member connected to one of the housing and the external cutting member and a second supporting member connected to the other one of the housing and the external cutting member for cooperation with the first supporting member, wherein the first supporting member comprises at least two supporting surface segments which are each inclined with respect to a tangential direction relative to the axis of rotation, and wherein the second supporting member comprises at least two abutment elements which are each configured and arranged for abutment against a respective one of the at least two supporting surface segments in the axial direction relative to the axis of rotation.

10. The shaving unit as claimed in claim 9, wherein the respective one of the first and second supporting members connected to the external cutting member is integrally formed with the plastic carrier.

11. The shaving unit as claimed in claim 9, wherein the first supporting member is connected to the housing, wherein the at least two supporting surface segments are provided in a guiding channel provided in a cylindrical inner wall of the housing surrounding the external cutting member, wherein the second supporting member is connected to the external cutting member, and wherein the at least two abutment elements engage said guiding channel.

12. A shaving apparatus comprising a main body accommodating a drive system and further comprising a shaving unit as claimed in claim 1 coupled to the main body.

13. The shaving unit of in claim 1, further comprising an indication of a height level of the skin contacting surface.

14. The shaving unit of in claim 1, further comprising a first indication of a raised level of the skin contacting surface and a second indication of a lowered level of the skin contacting surface.

15. The shaving unit of in claim 14, wherein the first and second indications are different colors.

16. A shaver omprising a housing and a cutter supported by the housing, wherein the cutter comprises:

an external cutter having a plurality of hair-entry openings provided in a skin contacting surface of the external cutter member; and an internal cutter rotatable relative to the external cutter about an axis of rotation; and a locking system configured to prevent, during use, rotation of the external cutter relative to the housing at least in a rotational direction of the internal cutter about the axis of rotation, wherein the locking system comprises a first locking member connected to one of the housing and the external cutter and a second locking member connected to the other one of the housing and the external cutter for cooperation with the first locking member, wherein the first locking member comprises an annular array of N1 first arresting elements which are concentrically arranged relative to the axis of the rotation, and wherein the second locking member comprises N2 second arresting elements, and wherein the locking system is configured to rotate the external cutting member about the axis of rotation to engage the N2 second arresting element with the N1 first arresting element to angularly self-adjust the external cutting member verses the housing by flanks of a triangular geometry of the first and second arresting elements.

* * * * *